May 14, 1968
CHAO C. WANG
3,382,758
RING LASER HAVING FREQUENCY OFFSETTING
MEANS INSIDE OPTICAL PATH
Filed Dec. 5, 1963
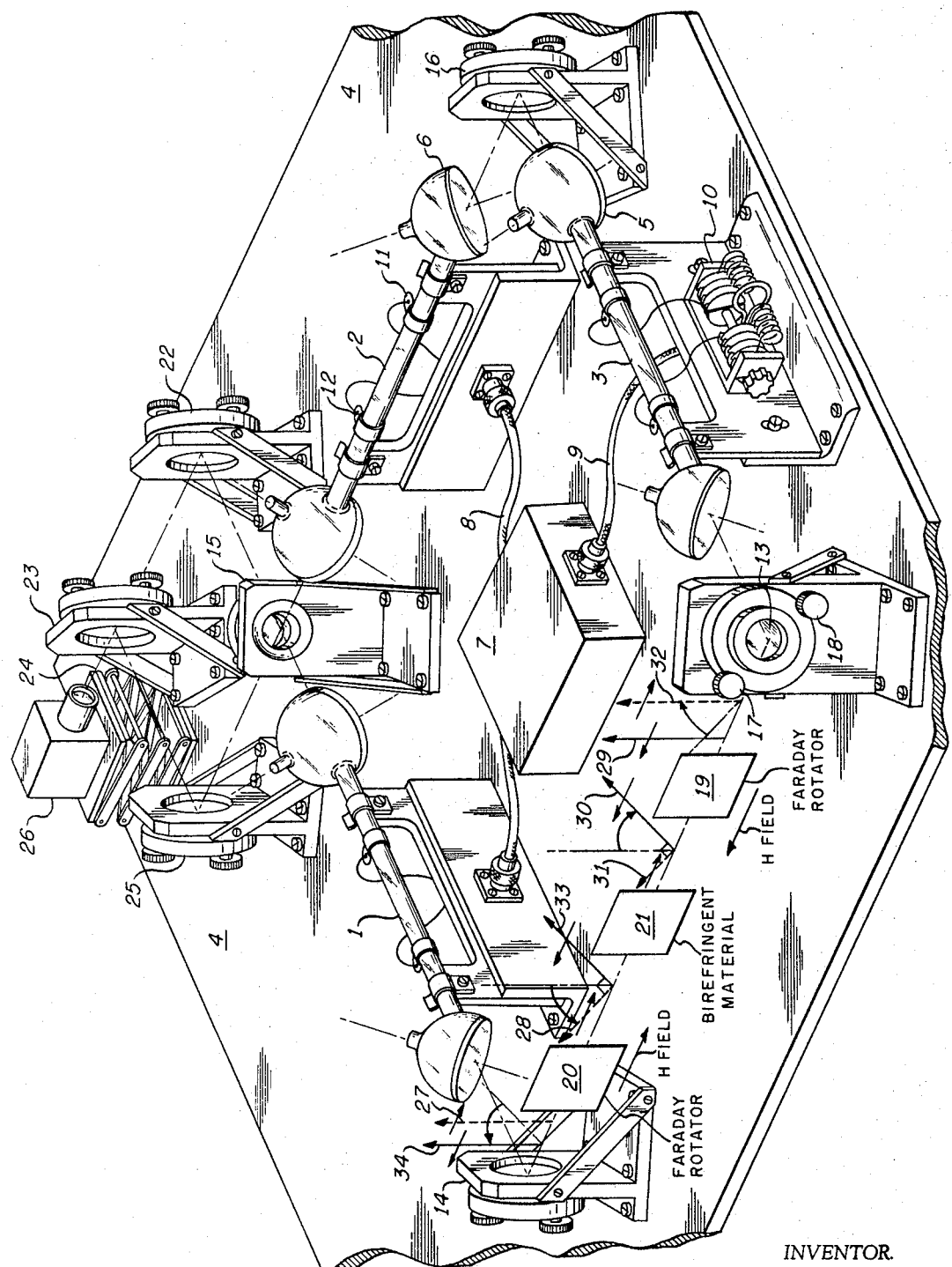
INVENTOR.
CHAO CHEN WANG
BY
*Robert J. Haase*
ATTORNEY United States Patent Office 3,382,758
Patented May 14, 1968

3,382,758
RING LASER HAVING FREQUENCY OFFSETTING MEANS INSIDE OPTICAL PATH
Chao C. Wang, Mineola, N.Y., assignor to Sperry Rand Corporation, Great Neck, N.Y., a corporation of Delaware
Filed Dec. 5, 1963, Ser. No. 328,326
8 Claims. (Cl. 88—14)

ABSTRACT OF THE DISCLOSURE

A ring laser having a lasing medium equipped with Brewster angle windows for the propagation of oppositely travelling linearly polarized light beams. A birefringent material, placed within the closed loop optical path, delays one of the oppositely travelling linearly polarized beams by an amount different from the delay introduced in the other beam. Said two beams pass through one of the corner mirrors of the ring laser and are heterodyned in a photodetector to produce a finite beat note even in the absence of laser rotation.

The invention herein described was made in the course of or under a contract or subcontract thereunder, with the Department of the Air Force.

The present invention generally relates to devices for the sensing of rotation with respect to an inertial frame of reference and, more particularly, to a travelling wave ring laser for sensing the rate of rotation and the direction of rotation about an axis perpendicular to the plane of the ring.

Ring laser rotation sensors have been developed to perform the task of conventional mechanical devices such as, for example, a rate gyroscope, without the use of moving parts. Ring laser rotation sensors are patterned after the classical devices of G. Sagnac, A. A. Michaelson and G. H. Gale wherein the frequency shifts experienced by two beams of light travelling in opposite directions around a rotating closed loop path are used as a measure of the amount of path rotation. In the aforementioned classical devices, the two contrarotating beams of light were derived from incoherent light sources located external to the closed optical paths. The result was relatively poor frequency shift discrimination. In the ring laser, however, the contrarotating beams are produced by a coherent light source (laser) positioned within and forming an integral part of the rotating closed loop optical path. The use of coherent light makes feasible the measurements of much smaller rotational rates using greatly reduced path lengths relative to the rotational rates and path lengths associated with prior devices.

A ring laser rotation rate sensor is described in copending patent application S.N. 327,920 filed Dec. 4, 1963, now abandoned, in the name of Warren M. Macek and assigned to the present assignee. Briefly, the laser comprises a coherent light source located within a plane rectangular closed loop optical path. The source produces two beams of coherent light which travel in opposite directions around the aforesaid path. Each beam of light returns to its starting point in the path after the short but measurable interval of time required to traverse the loop at the finite velocity of light. If the light path is caused to rotate about an axis perpendicular to the plane of the path, a beam travelling in the same direction as the rotation would require a somewhat longer interval to return to its starting point. The effective path length travelled by the beam is lengthened by the distance that the starting point moves while the beam completes a traversal of the path. A beam of light, travelling in the direction opposite to the path rotation returns to its starting point in less time than if the path were not rotating because the effective path length of a complete traversal is shortened. The difference in the path lengths traversed by the two beams and, hence, the difference in frequency between the two beams is related to the rotational rate of the closed loop path. By extracting the counter-rotating beams from the closed loop and heterodyning the extracted beams to produce a beat note, the rotational rate of the path can be determined. The frequency of the beat note is directly related to the magnitude of the aforesaid rotational rate.

It has been found that the precision with which the frequency of the beat note can be ascertained depends upon the realization of certain ring laser desiderata. For example, it is important that the loss of light about the closed optical path be minimized in order that lasing action may be attained with minimum excitation. Minimum excitation of the laser active material reduces the likelihood of spurious lasing modes at a multiplicity of different frequencies. It is desirable that the two counter-rotating light beams be substantially monochromatic so that the beat note resulting from heterodyning the two beams be sharply indicative of rotation rate. Another requirement of the ring laser is that means be provided for ascertaining the direction of the rotation. Moreover, said means must be fully compatible with the techniques by which the light losses about the closed optical path are minimized in order that the accuracy of the rotational magnitude measurement be not compromised in the effort to sense the direction of rotation.

It is the principal object of the present invention to provide a travelling wave ring laser for the determination of rotation rate and the direction of rotation about an axis perpendicular to the plane of the ring.

Another object is to provide a rotation rate and rotation direction sensing ring laser characterized by minimum loss and requiring minimum excitation.

A further object is to provide a rotation rate and rotation direction sensing ring laser for producing an output signal having a sharply defined frequency representing rotation rate and the direction of rotation.

These and other objects, as will appear from the reading of the following specification, are achieved in the disclosed embodiment by the provision of three continuous wave helium-neon gas laser tubes within respective sides of a plane rectangular closed loop optical path. Each tube emits coherent light in both directions around the closed path. Highly reflecting mirrors at each of the four corners of the rectangle direct the coherent counter-rotating light beams around the path.

Means are provided within the fourth side of the closed path for delaying one of the counter-rotating light beams by an amount different from the delay introduced in the other beam whereby the effective closed loop optical path length traversed by one beam is different from the effective path length traversed by the other beam in the absence of rotation about an axis perpendicular to the plane of the optical path. The result is that the frequencies of the two counter-rotating beams are off set from each other by a fixed and known amount in the absence of ring laser rotation. Finite rotation in one sense about the aforesaid axis increases the frequency off set whereas rotation in an opposite sense reduces the frequency off set. A small portion of each of the counter-rotating beams leaves the closed optical path through a partially transmitting mirror at one of the corners. The extracted light beams are made collinear and directed on a photomultiplier cell to produce an output signal or beat note. By subtracting the known fixed off set frequency from the observed frequency of the beat note, both the magnitude and the direction of rotation about an axis perpendicular to the plane of the laser ring can be ascertained.

In the disclosed embodiment, the frequency off setting means is adapted to respond to linearly-polarized oppositely rotating coherent light beams which are utilized in the ring laser in order to minimize light loss around the closed path. Therefore, the frequency off setting means is fully compatible with and does not detract from the optimized design of ther ing laser.

For a more complete understanding of the present invention, reference should be had to the following specification and to the sole figure which is a partly schematic and partly perspective view of a typical embodiment.

Referring to the figure, the ring laser comprises three gas laser tubes 1, 2 and 3 which are supported relative to rotatable member 4 so that the longitudinal axes of the gas laser tubes are coplanar. In a typical instance, each laser tube is filled with helium-neon gas mixture. Each of the laser tubes is equipped with a pair of inclined optically flat windows such as window 5 of laser 3 and window 6 of laser 2. Each output window is inclined so that its normal is at Brewster's angle relative to the longitudinal axis of its respective laser tube. In the case where the windows are made of glass, the angle between the normal to the window surface and the longitudinal axis of the respective gas laser tube is approximately 57°.

The gas in each of the laser tubes is made to fluoresce by the application of a high frequency excitation potential derived from source 7. The excitation signal is applied by cables such as cables 8 and 9 to matching networks such as network 10. Each network, in turn, is connected to a pair of electrodes such as electrodes 11 and 12. It will be noted that the light produced by the fluorescence of the excited gas issues from the Brewster windows at both ends of each laser tube. The fluorescence produced within each laser tube is essentially unpolarized. On passing through the window at either end of the tube, however, the light becomes plane-polarized, i.e., the light is linearly polarized in the plane formed by the normal to the window and the longitudinal axis of the gas tube.

The light from each gas tube is directed around a closed loop rectangular optical path by the multiple layer dielectric corner reflectors 13, 14, 15 and 16. To simplify the optical alignment problem, it is convenient to employ a spherical mirror at one of the corners and planar mirrors at the remaining three corners. For example, spherical mirror 16 and planar mirrors 13, 14 and 15 may be used. In the specific case where the distance between the adjacent corners is 1 meter, the radius of curvature of mirror 16 may be 8 meters. As discussed in the aforementioned copending application S.N. 327,920 each of the mirrors 13, 14, 15 and 16 is arranged relative to the gas tubes so that the plane-polarized light from the gas tubes is perpendicular to the plane of incidence. It is convenient to mount the planar mirrors vertical to base member 4 and to rotate each of the gas tubes so that the generated light is plane polarized perpendicular to base member 4. Mirror tilt control knobs such as knobs 17 and 18 are provided at each of the mirrors to facilitate the proper orientation of the mirror relative to the plane-polarized light from the gas tubes.

Neglecting for the moment the function of Faraday rotators 19 and 20 and birefringent material 21 which are located along the side of the optical path lying between mirrors 13 and 14, the combination of the three gas tubes and the four corner mirrors comprises a ring laser, that is, a laser having a closed loop resonant cavity. The ring laser cavity has the extremely important property of permitting the establishment of two mutually exclusive contradirectional travelling resonant wave systems. Power from these two travelling wave systems is brought out through corner mirror 15 which, like mirrors 13, 14 and 16, partially transmits the light impinging upon it. In this manner, light from the counter-rotating beams is extracted from the ring cavity without disrupting the circulation of the beams within the cavity. The clockwise beam is partially transmitted through mirror 15, reflected by mirror 22 and is partially transmitted by mirror 23 along the axis 24. The counterclockwise beam is partially transmitted by mirror 15, reflected by mirrors 25 and 23 and is directed along axis 24. The two beams travelling along axis 24 impinge upon photodetector 26 which produces an output electrical signal in a conventional manner having a frequency equal to the difference in frequency between the incident light beams.

As taught in the aforementioned copending application S.N. 327,920, the Brewster angle windows cause each of the gas tubes in the ring cavity to oscillate substantially in a single mode of polarization. Only the linearly polarized mode which is transmitted through the windows without reflection absorbs excitation energy. The orientation of the corner mirrors, whereby the linearly-polarized light is made perpendicular to the plane of incidence, minimizes losses that otherwise would occur if the plane polarized light were not perpendicular to the plane of incidence. If the perpendicular relationship were not met, elliptically polarized light would be reflected and would not pass without loss through the Brewster angle window next following around the resonant ring. Thus, the discussed embodiment minimizes the loss of light of both of the counter-rotating beams and reduces the amount of excitation required to sustain lasing action. The reduced excitation lessens the number of spurious lasing modes so that more nearly monochromatic coherent light beams are propagated within the ring whereby a more sharply defined beat note is produced to permit accurate ring velocity determination.

It will be seen that the frequency of the beat note produced by photodetector 26 is unaffected by the sense of the frequency difference between the counter-rotating light beams. Thus, in the absence of the functions performed by Faraday rotators 19 and 20 and birefringent material 21, the sense of the rotation of the ring laser could not be deduced from the beat note, i.e., the same beat note frequency would be produced for equal but opposite rotations of the ring laser. In accordance with the present invention, however, rotation direction ambiguities are resolved by introducing a frequency off set between the counter-rotating beams in the absence of ring laser rotation. This is the purpose of Faraday rotators 19 and 20 and birefringent material 21.

An important feature of the present invention is that the frequency off setting means is fully compatible with the linearly-polarized light of the counter-rotating beams on which the enhanced efficiency and accuracy of the ring laser depends. In essence, rotator 20 receives the counterclockwise rotating linearly-polarized beam represented by dashed vector 27 and rotates its plane of polarization by 45° into the position represented by dashed vector 28. Similarly, rotator 19 receives the clockwise rotating linearly polarized beam represented by the solid vector 29 and rotates its plane of polarization by 45° to the position represented by solid vector 30. It will be observed that vectors 28 and 30 are in space quadrature with respect to each other at their respective ends of birefringent material 21. The plane polarized light represented by vectors 28 and 30 propagates in opposite directions through birefringent material 21 whose principal axes are aligned to the perpendicular planes of polarization of the counter-rotating light beams. Consequently, each of the two counter-rotating beams experiences a different refractive index in propagating through material 21 and suffers a correspondingly different delay.

The path length difference $\Delta l$ equivalent to the difference between the delays encountered by the two beams in passing through birefringent material 21 causes the length $l$ of the closed loop optical path (in the absence of material 21) seen by one beam to change by a related amount. The change in the path length, in turn, produces a corresponding offset ($\Delta f$) between the frequencies of the counter-rotating beams of light substantially in accordance with the expression $\Delta f = f \Delta l/l$ where $f$ represents the frequency which would be assumed by both beams in the absence of material 21. Preferably, birefringent material 21 introduces a frequency offset greater than the frequency shift resulting from the maximum contemplated ring laser rotation. Excessive offset such as resulting from an unnecessarily long length of material 21 is to be avoided in order to minimize loss of the light passing through the material.

The counterclockwise travelling beam represented by vector 28 is represented by dashed vector 31 after passing through material 21. The plane of polarization of said beam is returned to the vertical plane represented by dashed vector 32 after passing through rotator 19. Oppositely directed axial magnetic fields are applied to rotators 19 and 20 so that opposite rotations are experienced by a given beam. Similarly, the clockwise rotating beam represented by vector 30 is represented by vector 33 after passing through material 21. The plane of polarization of said beam is returned to the vertical plane represented by solid vector 34 on passing through rotator 20. The angular rotation of the two rotators 19 and 20 annul each other so that each of the counter-rotating beams is restored to vertical polarization after passing through the offsetting means comprising rotators 19 and 20 and birefringent material 21. The restoration of vertical polarization permits the counter-rotating beams to propagate around the remainder of the closed loop optical path with minimum loss to preserve the efficiency and accuracy of the ring laser rotation rate sensor.

Any conventional material of natural or electrically controlled birefrigence which is transparent to the contrarotating beams is suitable for use as material 21. The known indices of refraction presented to the counter-rotating beams propagating along the principal axes of the selected birefringent material produces a predictable frequency offset between two beams in the absence of ring laser rotation. The frequency offset causes a known beat note frequency at the output of photodetector 26. Therefore, the magnitude of the rotation as well as the sense of the rotation experienced by the ring laser can be determined simply by measuring the frequency of the beat note and subtracting the known frequency offset from the measured beat note frequency.

It will be observed that material 21 is birefrigent to linearly polarized beams of light which are oriented perpendicularly to each other. The purpose of rotators 19 and 20 merely is to properly couple the vertically polarized contrarotating beams to such a birefringent material. Other equivalent arrangements will occur to those skilled in the art whereby the contrarotating beams may be differentially delayed to cause a frequency split or offset. If the material chosen exhibits birefringence to other than linearly polarized light, the coupling devices corresponding to 19 and 20 would have to be modified accordingly. For example, the coupling devices could be quarter-wave plates to convert the vertically polarized contrarotating beams to a pair of oppositely sensed circularly polarized beams if the material chosen were birefringent to light of such type.

Although three gas laser tubes have been utilized in the disclosed embodiment, one or two tubes could be used in an otherwise identical ring cavity configuration. The closed loop cavity need not be rectangular in shape but may conform to any plane polygon including a triangle.

It should be recognized that the objects of the present invention can be achieved through the use of a lasing medium other than a gas such as, for example, a ruby rod whose extremities are cut to form Brewster angle windows to produce linearly-polarized light in the manner of the disclosed embodiment. Gas tube lasers are presently preferred particularly because they are more easily constructed for continuous operation in the present state of the art.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A ring laser rotation rate sensor having a plane polygonal closed loop optical path, said laser comprising
a reflecting mirror in said path at each corner of said path,
a lasing medium in said path for generating counter rotating coherent light beams along said path,
the opposite ends of said medium being provided with respective windows having normals inclined at Brewster's angle relative to said path whereby substantially linearly polarized light passes through said windows,
means for positioning each said mirror so that the plane of said linearly polarized light is perpendicular to the plane of incidence,
frequency off-setting means within said path for delaying one of the counter rotating linearly polarized light beams by an amount different from the delay introduced in the other beam whereby the effective closed loop optical path length traversed by one beam is different from the effective path length traversed by the other beam in the absence of rotation about an axis perpendicular to the plane of the optical path,
one of said mirrors partially transmitting the counter rotating light beams impinging thereon,
means for making collinear the beams transmitted through said one of said mirrors,
and means for heterodyning the collinear beams.

2. A ring laser as defined in claim 1 wherein said lasing medium comprises a mixture of helium and neon gases.

3. A ring laser as defined in claim 1 wherein said frequency off-setting means comprises a pair of Faraday rotators and a birefringent material positioned between said rotators,
said rotators being arranged so that the angular rotation imparted to each one of the counter rotating beams by one of said rotators is annulled by the angular rotation imparted to said one of said counter rotating beams by the other rotator.

4. A ring laser rotation rate sensor having a plane polygonal closed loop optical path, said laser comprising
a reflecting mirror in said path at each corner of said path,
a plurality of lasing mediums in said path for generating counter rotating coherent light beams along said path,
the number of said plurality of mediums equalling one less than the number of sides of said path,
the opposite ends of each said medium being provided with respective windows having normals inclined at Brewster's angle relative to said path whereby substantially linearly polarized light passes through said windows,
means for positioning each said mirror so that the plane of said linearly polarized light is perpendicular to the plane of incidence,
frequency off-setting means within said path for delaying one of the counter rotating linearly polarized light beams by an amount different from the delay introduced in the other beam whereby the effective closed loop optical path length traversed by one beam is different from the effective path length traversed by the other beam in the absence of rotation about an axis perpendicular to the plane of the optical path,
one of said mirrors partially transmitting the counter rotating light beams impinging thereon, means for making collinear the beams transmitted through said one of said mirrors, and means for heterodyning the collinear beams.

5. A ring laser as defined in claim 4 wherein each of said lasing mediums comprises a longitudinally extensive gas tube, the longitudinal axis of each said tube being coincident with a respective side of said path.

6. A ring laser as defined in claim 4 wherein said frequency off-setting means comprises a pair of Faraday rotators and a birefringenet material positioned between said rotators, said rotators being arranged so that the angular rotation imparted to each one of the counter rotating beams by one of said rotators is annulled by the angular rotation imparted to said one of said counter rotating beams by the other rotator.

7. A ring laser having a plane rectangular closed loop optical path, said laser comprising a reflecting mirror at each corner of said path, three longitudinally extensive gas tubes in said path, the longitudinal axis of each said tube being coincident with a respective side of said path, said tubes generating counter-rotating coherent light beams along said path, the opposite ends of each said tube being provided with respective windows having normals inclined at Brewster's angle relative to the respective side of said path whereby substantially linearly polarized light passes through said windows, means for positioning each said mirror so that the plane of said linearly polarized light is perpendicular to the plane of incidence, frequency off-setting means within said path for delaying one of the counter rotating linearly polarized light beams by an amount different from the delay introduced in the other beam whereby the effective closed loop optical path length traversed by one beam is different from the effective path length traversed by the other beam in the absence of rotation about an axis perpendicular to the plane of the optical path, one of said mirrors partially transmitting the counter rotating light beams impinging thereon, means for making collinear the beams transmitted through said one of said mirrors, and means for heterodyning the collinear beams.

8. A ring laser as defined in claim 7 wherein said frequency off-setting means comprises a pair of Faraday rotators and a birefringent material positioned between said rotators, said rotators being arranged so that the angular rotation imparted to one of the counter rotating beams by each one of said rotators is annulled by the angular rotation imparted to said one of said counter rotating beams by the other rotator.

References Cited

Electromagnetic Angular Rotation Sensing, Sperry Report No. AB–1108–0016–1, September 1963, Report on Contract No. AF 33 (657)–11433. Only pertinent pages are copied pp. 4–1, 4–2, 4–3.

JEWELL H. PEDERSEN, *Primary Examiner.*

B. J. LACOMIS, *Assistant Examiner.*